(12) United States Patent
Cha

(10) Patent No.: US 6,830,662 B2
(45) Date of Patent: Dec. 14, 2004

(54) PROCESS FOR MICROWAVE DESTRUCTION OF HARMFUL AGENTS AND WASTE

(76) Inventor: Chang Yul Cha, 3807 Reynolds St., Laramie, WY (US) 82072

( * ) Notice: Subject to any disclaimer, the term of this patent is extended or adjusted under 35 U.S.C. 154(b) by 238 days.

(21) Appl. No.: 10/071,280

(22) Filed: Feb. 7, 2002

(65) Prior Publication Data

US 2002/0189928 A1 Dec. 19, 2002

Related U.S. Application Data

(63) Continuation-in-part of application No. 09/662,663, filed on Sep. 15, 2000, now Pat. No. 6,419,799, which is a continuation-in-part of application No. 09/249,966, filed on Feb. 12, 1999, now Pat. No. 6,207,023.

(51) Int. Cl.$^7$ .............................. C07C 1/00; A62D 3/00
(52) U.S. Cl. .................................. 204/157.15; 588/227
(58) Field of Search ...................... 204/157.15; 422/22; 588/227

(56) References Cited

U.S. PATENT DOCUMENTS

| 5,968,400 | A | * | 10/1999 | Wicks et al. | ................. 219/679 |
| 6,187,988 | B1 | * | 2/2001 | Cha | ........................... 588/227 |
| 6,262,405 | B1 | * | 7/2001 | Wicks et al. | ................. 219/679 |

* cited by examiner

*Primary Examiner*—Edna Wong
(74) *Attorney, Agent, or Firm*—John O. Mingle

(57) ABSTRACT

The subject invention provides a potentially economically viable process for the microwave destruction of contaminated waste consisting essentially of chemical and biological agents and harmful medical waste by employing carbonaceous materials to enhance the efficiency of the microwaves while keeping the bulk temperature down to a modest rise.

8 Claims, No Drawings

PROCESS FOR MICROWAVE DESTRUCTION OF HARMFUL AGENTS AND WASTE

This application is a continuation-in-part of application Ser. No. 09/662,663, filed Sep. 15, 2000, and issued as U.S. Pat. No. 6,419,799, whose specification is hereby incorporated by reference, and this is itself a continuation-in-part of Ser. No. 09/249,966, filed Feb. 12, 1999, and issued as U.S. Pat. No. 6,207,023.

BACKGROUND OF INVENTION

1. Field of Invention

The present invention relates to a process using radiofrequency microwave energy for the destruction of contaminated material consisting essentially of chemical and biological agents and harmful medical waste.

2. Background

In today's modern world much contaminated waste is generated. Such contaminated waste may contain chemical and biological agents that are harmful to humans. In a conventional process for the destruction of these chemical and biological agents and harmful medical waste high temperatures are employed to incite incineration. In the field of chemistry this breaking up of molecules by heat is generally called pyrolysis, thus, such destruction is pyrolytic elimination. Since such products of pyrolysis may themselves be harmful, further treatment must be considered before release.

Conversely the subject process employs microwaves to destroy these chemical and biological agents and harmful medical waste. This process keeps the bulk temperature down to a modest level below about 300° F. To further enhance the effect of microwaves at low temperatures, carbonaceous material is employed. The gaseous products of such microwave pyrolysis are further treated by additional microwaves that enhance their catalytic oxidation to environmentally releasable substances.

It is noted that chemical agents and biological agents are a special class of chemicals and are not identical to a hazardous material classification. Chemical agents are commonly related to "poisonous gaseous" and other such chemical compounds and are often employed in warfare or terrorist activities. In World War I mustard gas, $C_4H_8Cl_2S$, was so employed as was cyanide gases.

Biological agents although composed of organic molecules in a microorganism form have a special designation of being able to severely and usually fatally attack living organisms. Anthrax spores are such a biological agent and are employed in terrorist activities. Such biological agents are potentially carried by gas or liquid streams or may be clinging to material, such as cloth, metals, or other solids. In a liquid medium, such biological agents are often in a largely water arena; however, other biological cultures, which can be harmful or not, are often present. For instance, milk or its liquid food equivalents is such a biological culture and might be so contaminated; thus, in this instance the subject invention would substitute for a type of pasteurization process.

Potentially harmful waste occurs from medical processes, such as anything blood stained or contaminated with body solids or fluids. This medical waste is commonly solid material but its virgin pyrolyzed gaseous products have been recently recognized as potentially hazardous by a governmental agency. A common situation occurs in the Navy on board ships and submarines where space is limited and medical operations must proceed in a safe, but rapid manner.

Thus the subject invention deals with harmful agents and waste and not hazardous material, which is associated with various chemicals so identified by governmental regulations that cannot be routinely released into the environment, or if found in the environment, must be specially processed to avoid human contact and exposure.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwave" or "microwaves" is generally employed to represent "radiofrequency energies selected from the range of about 500 to 5000 MHz," since in a practical sense this large range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither of these conditions is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates; thus, in this writing the term "microwave catalysis" refers to "the absorption of microwave energy by carbonaceous materials when a simultaneous chemical reaction is occurring." For instance, refer to Kirk-Othmer, *Encyclopedia of Chemical Technology*, 3rd Edition, Volume 15, pages 494–517, Microwave Technology.

Related United States microwave patents include.

| U.S. Pat. No. | Inventor | Year |
| --- | --- | --- |
| 6,045,663 | Cha | 2000 |
| 6,046,376 | Cha et al. | 2000 |
| 6,187,988 | Cha | 2001 |
| 6,207,023 | Cha | 2001 |

Referring to the above list, Cha '663 discloses the enhancement of wet oxidation by microwaves utilizing carbonaceous material. Wet oxidation involves a water medium saturated with oxygen and containing organic contaminants, such as hazardous solvents, but not containing biological material. The process shows that such carbonaceous material, often activated carbon, preferentially absorbs microwaves in the presence of water.

Cha et al. disclose the enhancement of gaseous decomposition from a solution by microwaves utilizing carbonaceous material. An important example is the wet calcination of bicarbonate solutions, such as trona. The decomposition reaction is restricted to inorganic chemicals. The process shows that such carbonaceous material, often activated carbon, preferentially absorbs microwaves in the presence of water.

Cha '988 discloses the decomposition of hazardous materials by the use of microwaves enhanced by carbonaceous material, often activated carbon. The hazardous material is restricted to those organic compounds that are legally classified in this manner and not to material that could be classified as only harmful. A selected microorganism, pseudomonas bacteria, which is not a biological agent, was also decomposed. The process shows that the required decomposition occurs either with a water or gaseous medium.

Cha '023 discloses the purification of air by microwaves along with carbonaceous material, often activated carbon. The bed of carbonaceous material adsorbs the air contaminants, such as volatile organic compounds, and leaves purified air. Then microwaves along with a purge gas regenerate the carbonaceous material, and the purge gas then passes to an oxidation catalyst bed for further microwave-enhanced oxidation of the purge gas contaminants. The actual air purification is a conventional activated carbon bed process while microwaves are only employed to regenerate the bed and further enhance oxidation of the purge gas. The air contaminants are commonly organic compounds such as hazardous solvents. The process showed an efficient procedure to purify large amounts of air such as is found with clean room applications, and in particular showed that the oxidation catalyst bed enhanced by microwaves and carbonaceous material is very efficient in handling the destruction of hazardous gas-borne materials.

SUMMARY OF INVENTION

The objectives of the present invention include overcoming the above-mentioned deficiencies in the prior art and providing a potentially economically viable process for the microwave destruction of contaminated waste, consisting essentially of chemical and biological agents and harmful medical waste, by employing carbonaceous materials to enhance the efficiency of the microwaves while keeping the bulk temperature down to only a modest rise.

DETAILED DESCRIPTION OF INVENTION

Microwaves are a versatile form of energy that is applicable to enhance chemical reactions since the energy is locally applied by its largely vibrational absorption by polar molecules and further does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in electron vibrational modes. Consequently the waveguide design for the microwave cavity is not usually critical. Carbonaceous material for use with the subject invention commonly comprises activated carbon, char, soot, pyrolytic carbon, carbon black, activated charcoal, and metal carbides. In many instances activated carbon is the preferred material to employ under ambient temperature and pressure conditions, although activated charcoal, if readily available, is likely more cost effective. However in gaseous systems, especially at higher temperatures, other carbonaceous materials such as metal carbides, especially silicon carbide, are convenient to utilize. Silicon carbide is conveniently utilized as a microwave absorbing substrate to enhance conventional catalytic processes.

The microwave excitation of the molecules of the carbonaceous material, often referred to as microwave catalysis, excites constituents, such as impurities and contaminants including chemical and biological agents, which have been adsorbed on, or in some instances attracted to, the surfaces of the carbonaceous material and produces a highly reactive condition. Further molecules from a carrier medium, such as a sweep or purge gas, are in close proximity or within the surface boundary layer of the carbon surface through chemisorption, absorption, adsorption, or diffusion, and additional chemical reactions with these constituents are possible.

Additionally, carbonaceous materials, particularly activated carbon, preferentially absorb microwaves in the presence of water. Thus aqueous mediums are employable to transmit the contaminated wastes.

The following examples employ apparatus that is common for the use of radiating a subject matter by microwaves in the presence of carbonaceous materials. Said apparatus has been shown and explained in previous patents by the inventor: U.S. Pat. Nos. 6,045,663; 6,046,376; 6,187,988; and 6,207,023 are typical; and these specifications and drawings are hereby incorporated by reference.

EXAMPLE 1

The destruction of acetonitrile, $CH_3CN$, is utilized as an example of the microwave treatment of a chemical agent as this chemical is related to the class of cyanide chemical warfare agents. The microwave reactor employed a helical waveguide wound around a microwave-passing quartz container. Air was employed as a sparge or purge gas and the acetonitrile was injected into the input air, while the velocity through the reactor was maintained at 25 ft/min. A Total Hydrocarbon Analyzer (THA), such as Model 51 of Thermal Environmental, or equivalent, measured the input and the outlet gas values over time. The carbonaceous bed was a silica-based oxidation catalyst mixed with silicon carbide particles and was preheated for 30 minutes. The inlet concentration of acetonitrile was 350 ppm. A microwave power of 400 watts using 2450 MHz frequency resulted in 100 percent destruction of the acetonitrile while the temperature only reached 133° F.

EXAMPLE 2

Using the same apparatus as in Example 1, complete destruction of an inlet concentration of 30 ppm of acetonitrile occurred with only 300 watts of microwave power.

EXAMPLE 3

Using the same experimental setup as in Example 2 but now without preheating the bed, and employing 500 watts of microwave power, 40 percent destruction of acetonitrile occurred as soon as the microwave energy was applied. Further 100 percent destruction occurred in 30 minutes.

EXAMPLE 4

Using the same experimental setup as in Example 3, the contaminant was changed to 30 ppm of methyl tert-butyl ether, and the complete destruction now took 50 minutes.

EXAMPLE 5

For the pyrolysis of medical waste, a two stage reactor was employed. In the first stage a silicon carbide bed was the carbonaceous material and the medical waste was compacted on top of the bed. The second stage was an oxidation catalyst mixed with silicon carbide into a single bed. The beds of both stages were fed microwaves through helix waveguides from separate microwave generators. The purge gas was nitrogen at 15 SCFH and passed up through both stages moving the gases generated from the medical waste pyrolysis reactor stage into the oxidation catalyst reactor stage. In order to insure oxidation, air was inserted between the two stages. The THA outlet concentrations from both stages were measured over time. The THA measurements from the pyrolysis stage became readable at 10 minutes and returned to zero at approximately 55 minutes. The THA measurements from the oxidation stage remained at zero for the entire time.

EXAMPLE 6

To show that microwaves are an effect disinfectant or perform sterilization for liquid biological materials, such as a microorganism culture containing a biological agent, *Escherichia coli* (*E. coli*) water cultures were utilized. The microwave reactor now contained a bed of 450 grams of granular activated carbon and the water culture of *E. coli* flowed at a rate of one liter per minute through the bed, while being irradiated with microwaves. Heterotropic plate counts determined the number of viable cells present in the feed stock as well as the outlet sample. Complete sterilization occurred with a microwave exposure time of one minute.

A process for microwave destruction of solid contaminated waste comprising compacting said waste on a platform, wherein said platform contains a carbonaceous substance and radiating said platform with microwaves to produce pyrolysis of said waste. Collecting vapors from said pyrolysis with a purge gas and treating said purge gas with microwaves while passing through an oxidation catalyst bed energized with a carbonaceous substance. The platform is designed to hold generally solid materials. This could be contaminated medical materials, even instruments, or materials contaminated by chemical or biological agents, since the contaminated waste is selected from the group of harmful wastes consisting of chemical agents, biological agents, and medical waste.

All carbonaceous substances are from the group consisting of activated carbon, char, soot, pyrolytic carbon, activated charcoal, metal carbides, and combinations thereof. The purge gas further comprises significant oxygen in order to enhance pyrolysis. The oxidation catalyst bed energized with a carbonaceous substance is selected from the group consisting of silicon carbide pellets mixed with oxidation catalyst particles, oxidation catalyst particles with a substrate impregnated with silicon carbide, and oxidation catalyst particles deposited over a center of silicon carbide. The microwaves are selected from the frequency range of 500 to 5000 MHz.

A process for the microwave destruction of a liquid contaminated waste stream comprising passing said stream through a bed of carbonaceous substance while radiating said bed with microwaves to produce pyrolysis of said waste. The contaminated waste further comprises being selected from the group of harmful wastes consisting of chemical agents, biological agents, and medical waste. The liquid contaminated waste stream further comprises a biological culture. The biologically contaminated liquid waste stream often contains biological agents in a normally dilute concentration, and this could occur when washing down contaminated areas, such as the inside of building.

A process for the microwave destruction of a gaseous contaminated waste stream comprising passing said stream through a bed of carbonaceous substance while radiating said bed with microwaves to produce pyrolysis of said waste. Then treating said stream with microwaves while passing through an oxidation catalyst bed energized with a carbonaceous substance. The stream contains enough oxygen in order to allow full pyrolysis. The contaminated waste is selected from the group of harmful wastes consisting of chemical agents, biological agents, and medical waste. All carbonaceous substances are selected from the group consisting of activated carbon, char, soot, pyrolytic carbon, activated charcoal, metal carbides, and combinations thereof. The oxidation catalyst bed energized with a carbonaceous substance is preferably selected from the group consisting of silicon carbide pellets mixed with oxidation catalyst particles, oxidation catalyst particles with a substrate impregnated with silicon carbide, and oxidation catalyst particles deposited over a center of silicon carbide.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for microwave destruction of solid harmful contaminated waste comprising:
   compacting said waste on a platform, wherein said platform contains a carbonaceous substance;
   radiating said platform with microwaves to produce pyrolysis of said waste;
   collecting vapors from said pyrolysis with a purge gas; and
   treating said purge gas with microwaves while passing through an oxidation catalyst bed energized with a carbonaceous substance, wherein said purge gas exit temperature does not exceed 300° F.

2. The process according to claim 1 wherein said harmful contaminated waste is selected from the group consisting of chemical agents, biological agents, and medical waste.

3. The process according to claim 1 wherein all carbonaceous substances are selected from the group consisting of activated carbon, char, soot, pyrolytic carbon, activated charcoal, metal carbides, and combinations thereof.

4. The process according to claim 1 wherein said purge gas comprises significant oxygen in order to enhance said pyrolysis.

5. The process according to claim 1 wherein said oxidation catalyst bed energized with a carbonaceous substance is selected from the group consisting of silicon carbide pellets mixed with oxidation catalyst particles, oxidation catalyst particles with a substrate impregnated with silicon carbide, and oxidation catalyst particles deposited over a center of silicon carbide.

6. A process for microwave destruction of solid harmful contaminated waste comprising compacting said waste on a platform, wherein said platform contains silicon carbide;

radiating said platform and said waste with microwaves to produce pyrolysis of said waste;

collecting vapors from said pyrolysis with an oxygen containing purge gas; and performing microwave catalysis while passing said purge gas through an oxidation catalyst, wherein said purge gas exit temperature does not exceed 300° F.

7. The process according to claim 6 wherein said harmful contaminated waste is selected from the group consisting of chemical agents, biological agents, and medical waste.

8. The process according to claim 6 wherein said oxidation catalyst is selected from the group consisting of silicon carbide pellets mixed with oxidation catalyst particles, oxidation catalyst particles with a substrate impregnated with silicon carbide, and oxidation catalyst particles deposited over a center of silicon carbide.

* * * * *